United States Patent
Lai

(10) Patent No.: US 9,239,602 B2
(45) Date of Patent: Jan. 19, 2016

(54) PORTABLE ELECTRICAL ENERGY SOURCE WITH INCREASED POWER SUPPLY EFFICIENCY

(71) Applicant: HON HAI PRECISION INDUSTRY CO., LTD., New Taipei (TW)

(72) Inventor: Chih-Chen Lai, New Taipei (TW)

(73) Assignee: HON HAI PRECISION INDUSTRY CO., LTD., New Taipei (TW)

( * ) Notice: Subject to any disclaimer, the term of this patent is extended or adjusted under 35 U.S.C. 154(b) by 282 days.

(21) Appl. No.: 13/925,300

(22) Filed: Jun. 24, 2013

(65) Prior Publication Data

US 2014/0176072 A1 Jun. 26, 2014

(30) Foreign Application Priority Data

Dec. 24, 2012 (TW) .............................. 101149428 A

(51) Int. Cl.
*H02J 7/02* (2006.01)
*G06F 1/26* (2006.01)
*G06F 1/16* (2006.01)

(52) U.S. Cl.
CPC .............. *G06F 1/263* (2013.01); *G06F 1/1635* (2013.01)

(58) Field of Classification Search
CPC ..... H02J 7/0044; H02J 7/0045; H02J 7/0042; Y02E 60/12; H01M 10/46

USPC .......................................................... 320/115
See application file for complete search history.

(56) References Cited

U.S. PATENT DOCUMENTS

| 4,710,693 | A | * | 12/1987 | Wigell | 320/115 |
| 5,394,073 | A | * | 2/1995 | Nagai | 320/115 |
| 5,686,810 | A | * | 11/1997 | Yasui | 320/113 |
| 2002/0195991 | A1 | * | 12/2002 | Son | 320/111 |
| 2004/0114320 | A1 | * | 6/2004 | Williams et al. | 361/685 |
| 2006/0091851 | A1 | * | 5/2006 | Kim | 320/112 |
| 2007/0236180 | A1 | * | 10/2007 | Rodgers | 320/115 |
| 2009/0160400 | A1 | * | 6/2009 | Woud | 320/115 |
| 2010/0232101 | A1 | * | 9/2010 | Yamasaki et al. | 361/679.01 |

* cited by examiner

Primary Examiner — Arun Williams
(74) Attorney, Agent, or Firm — Novak Druce Connolly Bove + Quigg LLP

(57) ABSTRACT

A portable electrical energy source provides power for a portable electronic device and includes a base, a chargeable battery, and a connector. The base includes a first surface and a second surface facing away from the first surface. The base defines a receiving room between the first surface and the second surface. The chargeable battery is received in the receiving room. The connector is positioned on the first surface and is electrically connected to the chargeable battery, which is electrically connected to the portable electronic device. The chargeable battery charges the portable electronic device through the connector.

13 Claims, 5 Drawing Sheets

PORTABLE ELECTRICAL ENERGY SOURCE WITH INCREASED POWER SUPPLY EFFICIENCY

BACKGROUND

1. Technical Field

The present disclosure relates to a portable electrical energy source.

2. Description of Related Art

Portable communication transceivers, such as mobile telephones, are becoming increasingly popular. In many instances, it is desirable to provide a visual display on the communications transceiver to supply the operator with a visual message or graphical image. The drawback is that the visual displays require relatively high electrical power, which causes the batteries to be depleted quickly.

Therefore, it is desirable to provide a portable electrical energy source that can overcome the above-mentioned limitations.

BRIEF DESCRIPTION OF THE DRAWINGS

Many aspects of the present disclosure can be better understood with reference to the following drawings. The components in the drawings are not necessarily drawn to scale, the emphasis instead being placed upon clearly illustrating the principles of the present disclosure.

DETAILED DESCRIPTION

Figure 1:
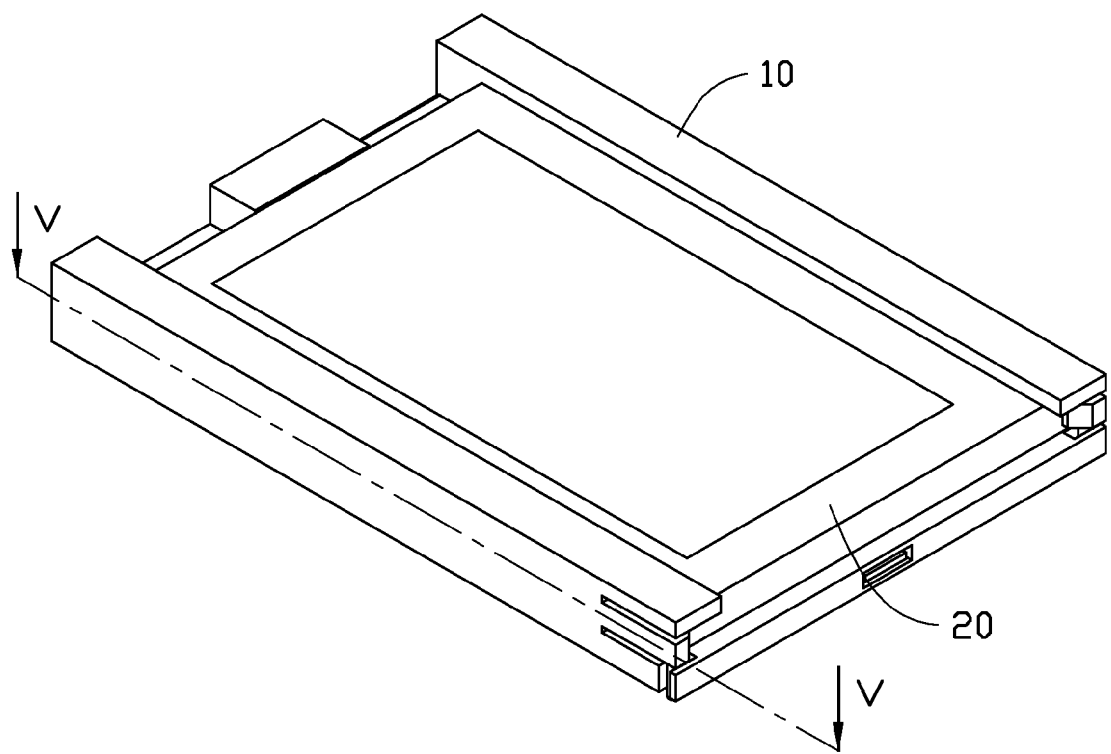
FIG. 1 is an assembled, isometric view of a portable electrical energy source in accordance with an exemplary embodiment.
Figure 2:
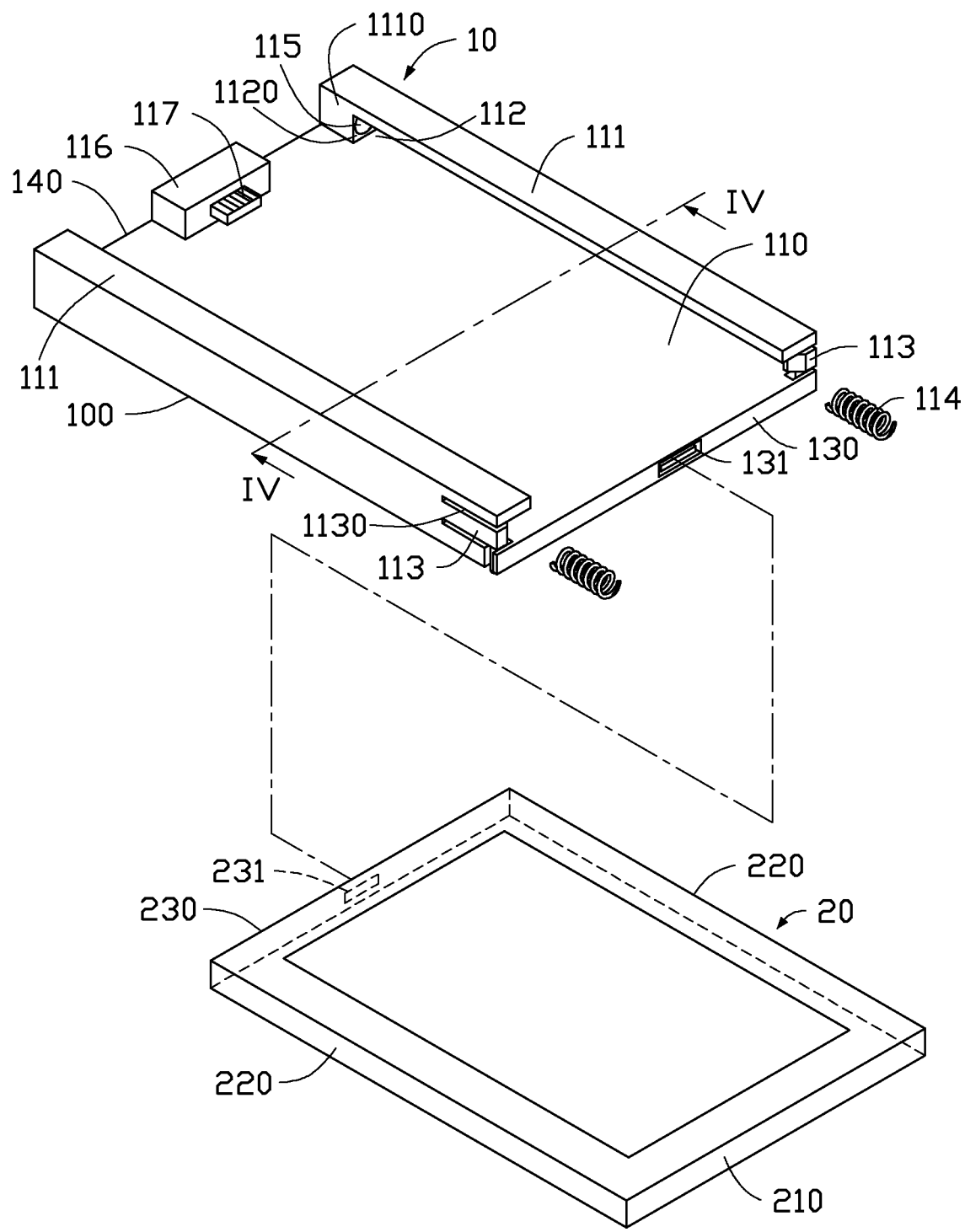
FIG. 2 is an exploded, isometric view of the portable electrical energy source of FIG. 1.
Figure 3:
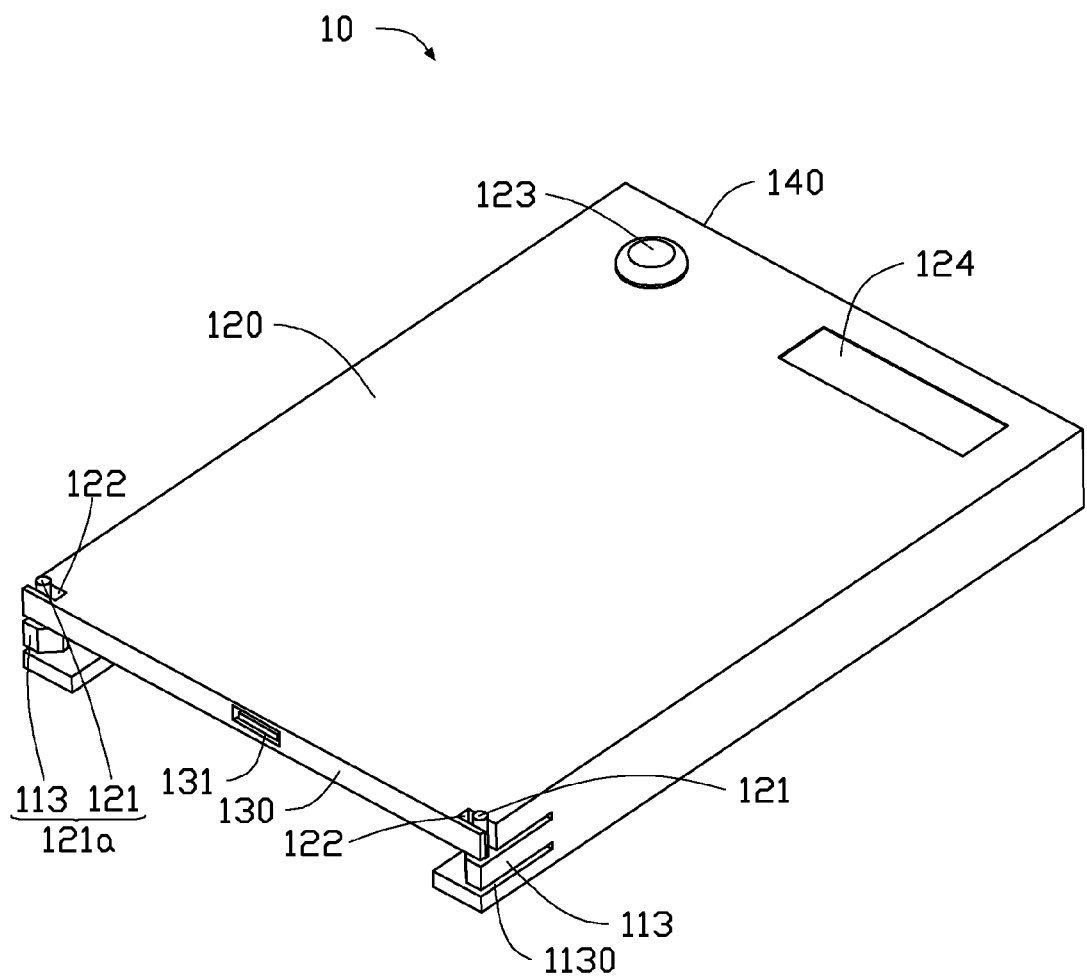
FIG. 3 is similar to FIG. 2, but viewed from another angle.
Figure 4:
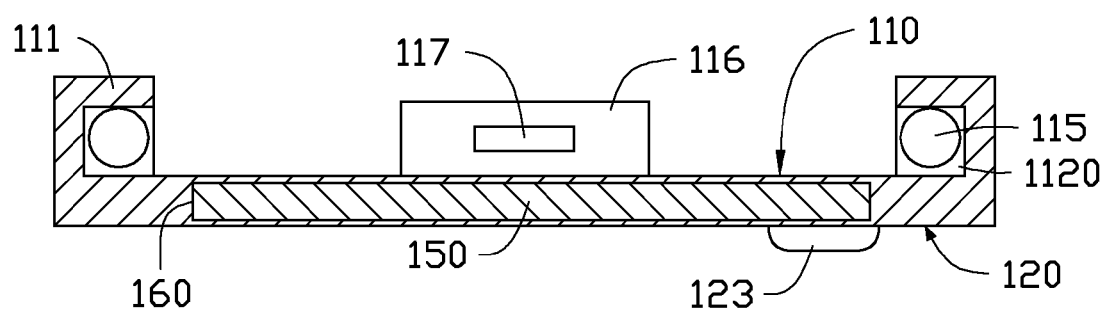
FIG. 4 is a cross-sectional view taken along line IV-IV of FIG. 2.

FIGS. 1-4 show a portable electrical energy source 10 configured to provide power for a portable electronic device, according to an embodiment. In the embodiment, the electronic device is a mobile phone 20. The mobile phone 20 is cuboid in shape and includes an upper surface 210, a lower surface 230 away from the upper surface 210, and four side surfaces 220. The upper surface 210 is substantially parallel to the lower surface 230. Each side surface 220 perpendicularly connects between the upper surface 210 and the lower surface 230. The mobile phone 20 also includes a charging port 231 positioned on the lower surface 230.

The portable electrical energy source 10 includes a base 100, two locking structures 121a, two springs 114, a connector 117, a chargeable battery 150, and various circuits (not shown).

The base 100 is substantially rectangular in shape and includes a first surface 110, a second surface 120 facing away from the first surface 110, a first sidewall 130, and a second sidewall 140 facing away from the first sidewall 130. The first surface 110 is substantially parallel to the second surface 120. The first sidewall 130 is substantially parallel to the second sidewall 140. Both the first sidewall 130 and the second sidewall 140 are perpendicularly connected between the first surface 110 and the second surface 120. The base 10 defines a receiving room 160 between the first surface 110 and the second surface 120 for receiving the chargeable battery 150 and the various circuits.

The base 100 includes two flanges 111 that perpendicularly extend upward from two opposite ends of the first surface 110. The two flanges 111 are integrally formed with the base 10. Each flange 111 defines a first receiving cavity 112 formed in a border of an inner sidewall 1110 of the flange 111 and the first surface 110, along the longitudinal direction of the flange 111. The first receiving cavities 112 extend from the first sidewall 130 toward the second sidewall 140. A height of the first receiving cavity 112 is equal to a height of the mobile phone 20 in a direction perpendicular to the first surface 110, so that the mobile phone 20 can be slid into the first receiving cavity 112.

Each locking structure 121a includes an elastic plate 113 and a locating strip 121. Both the elastic plate 113 and the locating strip 121 are integrally formed with the flange 111.

Each elastic plate 113 is positioned on an end of the first receiving cavity 112 that is close to the first sidewall 130. Each locating strip 121 is positioned on a side surface of the elastic plate 113 that is close to the first surface 110. The base 10 also defines two blind holes 122 that are formed on two opposite ends of the first surface 110 that are close to the first sidewall 130. The two blind holes 122 pass through the first surface 110 and the second surface 120. A lengthwise direction of the blind hole 122 is substantially parallel to a lengthwise direction of the first sidewall 130. Each locating strip 121 is movably received in one of the blind holes 122. One end of each flange 111 that borders the first sidewall 130 defines two slots 1130. The two slots 1130 are parallel to each other and surround the elastic plates 113 to make the elastic plate 113 have elasticity, therefore, each elastic plate 113 is capable of being bent outward from an outer sidewall of the flange 111 with the locating strip 121 moving out of the blind hole 122.

Each first receiving cavity 112 includes a vertical surface 1120 that is substantially perpendicular to the first surface 110. The vertical surface 1120 defines a second receiving cavity 115. Each spring 114 is partially received in the second receiving cavity 115 with one end of the spring 114 extending out of the second receiving cavity 115. A distance between the vertical surface 1120 and the elastic plate 113 is slightly longer than a length of the mobile phone 20, such that the mobile phone 20 is elastically sandwiched between the spring 114 and the elastic plate 113.

The base 10 also includes a supporting substrate 116 perpendicularly extending upward from one end of the first surface 110 that is close to the second sidewall 140. The connector 117 is positioned on an inner side surface of the supporting substrate 116. The shape and size of the connector 117 correspond with the shape and size of the charging port 231 of the mobile phone 20 respectively.

In the embodiment, the base 100 also includes a power button 123 and a power indicator 124. Both the power button 123 and the power indicator 124 are positioned on the second surface 120. The power button 123 controls the charging of the mobile phone 20. When the power button 123 is pressed, the mobile phone 20 is charged by the portable electrical energy source 10. When the power button 123 is pressed again, the portable electrical energy source 10 stops charging the mobile phone 20. The power indicator 124 displays the amount of power of the chargeable battery 150.

In the embodiment, the base 100 also includes a charging port 131 connected to an external power source (not shown) for charging the chargeable battery 150. The charging port 131 is positioned on the first sidewall 130.

The various circuits are configured to electrically connect the connector 117, the charging port 131, the power button 123, the power indicator 124, and the chargeable battery 150 together.

Figure 5:
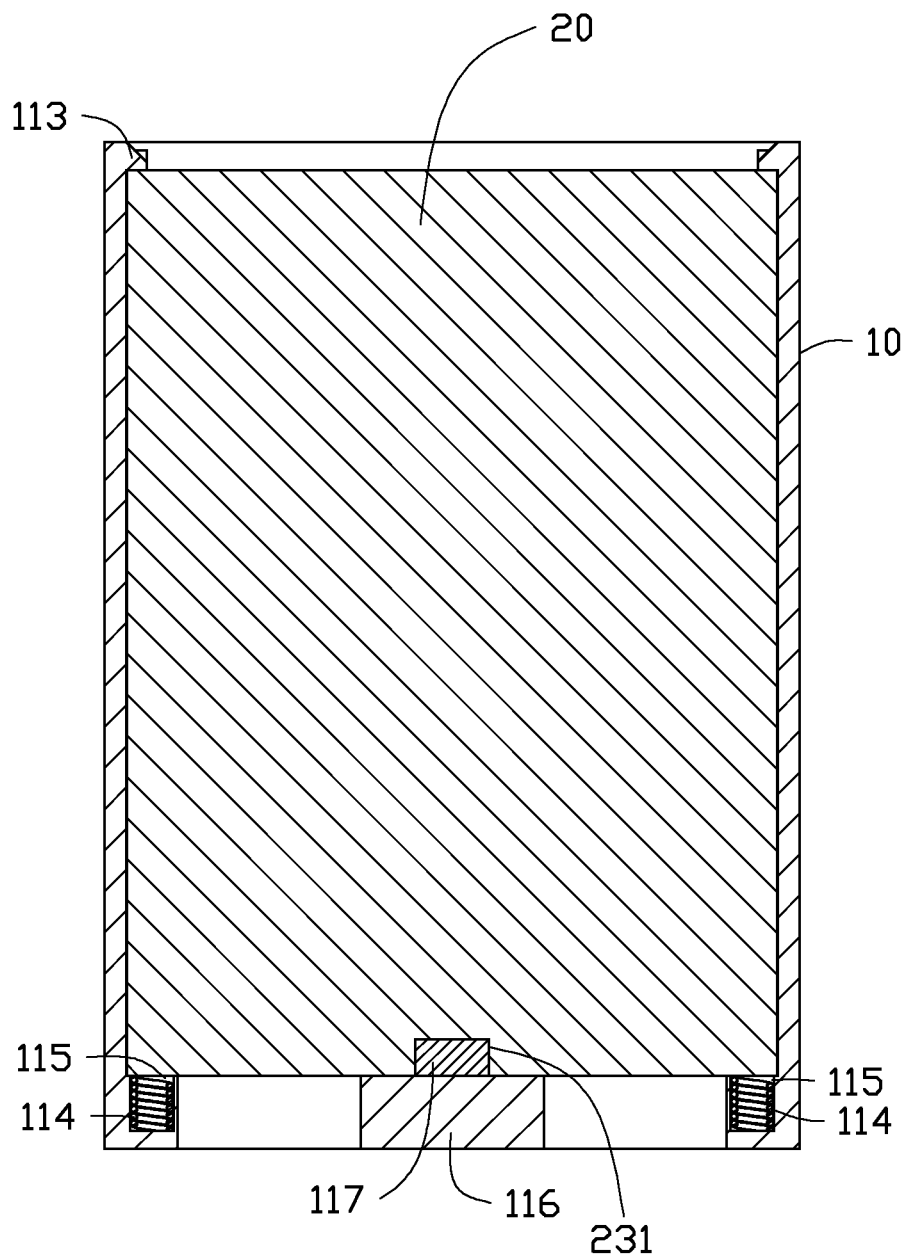
FIG. 5 is a cross-sectional view taken along line V-V of FIG. 1.

Also referring to FIG. 5, in use, the elastic plate 113 is bent outward from the outer sidewall of the flange 111. The mobile phone 20 is pushed downward along a passage defined by the first receiving cavity 112 until the elastic plate 113 elastically resists against the upper surface 210 of the mobile phone 20, and the mobile phone 20 is fittingly received in the first receiving cavity 112 with the spring 114 being compressed backward by the mobile phone 20. As such, the mobile phone 20 is elastically sandwiched between the spring 114 and the elastic plate 113 while the connector 117 is received in the charging port 231 to electrically connect to the charging port 231. Pressing the power button 123 charges the mobile phone 20 through the connector 117.

When the mobile phone 20 is finished charging, pressing the power button 123 again, stops the portable electrical energy source 10 from charging the mobile phone 20. Bending each of the two elastic plates 113 outward from the outer sidewall of the corresponding flange 111 and moving the locating strip 121 out of the blind hole 122. Elastically restoring the spring 114 and pushing the mobile phone 20 out of the first receiving cavity 112.

It is noteworthy that, in alternative embodiments, the charging port 131 can be positioned on the second surface 120 or on the second sidewall 140.

It is noteworthy that, in alternative embodiments, the power button 123 can be positioned on an end of the second surface 120 close to the first sidewall 130.

It is noteworthy that, in alternative embodiments, the second receiving cavity 115 can be omitted, and the spring 114 is directly connected to the vertical surface 1120 of the first receiving cavity 112.

It will be understood that the above particular embodiments are shown and described by way of illustration only. The principles and the features of the present disclosure may be employed in various and numerous embodiment thereof without departing from the scope of the disclosure as claimed. The above-described embodiments illustrate the possible scope of the disclosure but do not restrict the scope of the disclosure.

What is claimed is:

1. A portable electrical energy source configured to provide power for a portable electronic device, the portable electrical energy source comprising:
    a base comprising a first surface and a second surface facing away from the first surface, the base defining a receiving room between the first surface and the second surface;
    a chargeable battery received in the receiving room; and
    a connector positioned on the first surface and electrically connected to the chargeable battery, the connector configured to electrically connected to the portable electronic device, the chargeable battery charging the portable electronic device through the connector;
    two springs; and
    two locking structures;
    wherein the base further comprises two flanges that extend upward from two opposite ends of the first surface, each flange defines a first receiving cavity in a border of its inner sidewall and the first surface, the first receiving cavity is configured to receive the portable electronic device;
    wherein the base further comprises a first sidewall and a second sidewall facing away from the first sidewall, both the first sidewall and the second sidewall connect the first surface and the second surface, the first receiving cavity of each flange comprises a vertical surface that is substantially perpendicular to the first surface, the vertical surface defines a second receiving cavity communicating with the first receiving cavity, each spring is partially received in the second receiving cavity with one end of the spring extending out of the second receiving cavity, the two locking structures are respectively positioned on an end of the first receiving cavity that is close to the first sidewall, the two locking structures are configured to make the portable electronic device be fittingly received in the first receiving cavity and press the two springs;
    wherein each of the locking structures comprises an elastic plate, the elastic plate is positioned on the end of the first receiving cavity that is close to the first sidewall;
    wherein each of the locking structures further comprises a locating strip, the locating strip is positioned on a side surface of the elastic plate that is close to the first surface, the base defines two blind holes that are defined on two opposite ends of the first surface that are close to the first sidewall, each locating strip is movably received in a respective one of the blind holes, each the elastic plate is capable of being bent outward from an outer sidewall of the flange, with the locating strip moving toward a direction out of the blind hole.

2. The portable electrical energy source of claim 1, wherein the two flanges are integrally formed with the base.

3. The portable electrical energy source of claim 1, wherein a height of the first receiving cavity is equal to a height of the mobile phone, in a direction perpendicular to the first surface, and the mobile phone is capable of being slid into the first receiving cavity.

4. The portable electrical energy source of claim 1, wherein the base comprises a first sidewall and a second sidewall, the first and second sidewalls are both connected between the first and second surfaces, the base comprises a charging port, the charging port is positioned on the first sidewall for charging the chargeable battery.

5. The portable electrical energy source of claim 1, wherein a distance between the vertical surface and the elastic plate is slightly longer than a length of the portable electronic device.

6. The portable electrical energy source of claim 1, wherein one end of each flange that is close to the first sidewall defines two slots, and the two slots surround a respective one of the elastic plates.

7. The portable electrical energy source of claim 1, wherein the two blind holes pass through the first surface and the second surface.

8. The portable electrical energy source of claim 1, wherein a lengthwise direction of each of the blind holes is substantially parallel to a lengthwise direction of the first sidewall.

9. The portable electrical energy source of claim 1, wherein the base comprises a supporting substrate extending upward from one end of the first surface that is close to the second sidewall, and the connector is positioned on an inner side surface of the supporting substrate.

10. The portable electrical energy source of claim 1, wherein the base comprises a power button, when the power button is pressed, the portable electronic device is charged by the portable electrical energy source, when the portable electronic device is pressed again, the portable electrical energy source stop charging the portable electronic device.

11. The portable electrical energy source of claim 10, wherein the base comprises power indicator configured to display the amount of the chargeable battery.

12. The portable electrical energy source of claim 11, wherein both the power button and the power indicator are positioned on the second surface.

13. A portable electrical energy source configured to provide power for a portable electronic device, the portable electrical energy source comprising:

a base comprising a first surface, a second surface facing away from the first surface, two flanges extending upward from two opposite ends of the first surface, a first sidewall, and a second sidewall facing away from the first sidewall, both the first sidewall and the second sidewall connecting the first surface and the second surface, the base defining a receiving room between the first surface and the second surface, each flange defining a first receiving cavity in a border of its inner sidewall and the first surface, each first receiving cavity comprising a vertical surface substantially perpendicular to the first surface and away from the first sidewall, each vertical surface defining a second receiving cavity communicating with the first receiving cavity;

a chargeable battery received in the receiving room; and a connector positioned on the first surface and electrically connected to the chargeable battery, the connector configured to electrically connected to the portable electronic device, the chargeable battery charging the portable electronic device through the connector;

two springs each partially received in one second receiving cavity with one end of the spring extending out of the second receiving cavity; and two locking structures each respectively positioned on an end of one first receiving cavity that is close to the first sidewall, causing one locking structure and the corresponding spring to be positioned at two opposite ends of each first receiving cavity, the two locking structures configured to make the portable electronic device be fittingly received in the first receiving cavity and press the two springs.

* * * * *